United States Patent [19]

Pappas

[11] Patent Number: 4,797,567
[45] Date of Patent: Jan. 10, 1989

[54] SHUTTER CONTROL APPARATUS

[76] Inventor: Greg Pappas, 8490 York Rd., North Royalton, Ohio 44133

[21] Appl. No.: 6,915

[22] Filed: Jan. 27, 1987

[51] Int. Cl.$^4$ .............................................. H02J 9/06
[52] U.S. Cl. ........................................ 307/66; 307/64; 160/1; 160/133
[58] Field of Search ............................ 307/64, 66, 87; 160/133, 1, 7, 83 A, 296, 310, 311, 312, 314, 321, 330, 331; 363/34, 109; 318/801, 803, 807, 808

[56] References Cited

U.S. PATENT DOCUMENTS

| | | | |
|---|---|---|---|
| 3,614,461 | 10/1971 | Speer ...................................... | 307/64 |
| 3,746,878 | 7/1973 | Viger ...................................... | 307/66 |
| 3,818,272 | 6/1974 | Rich ...................................... | 307/66 X |
| 3,916,212 | 10/1975 | Prochazka et al. .................... | 307/66 |
| 4,104,539 | 8/1978 | Hase ...................................... | 307/66 X |
| 4,167,680 | 9/1979 | Gross .................................... | 307/66 |
| 4,195,233 | 3/1980 | Udvardi-Lakos ..................... | 307/66 |
| 4,246,633 | 1/1981 | Borkovitz ........................... | 307/66 X |
| 4,277,692 | 7/1981 | Small ..................................... | 307/66 |
| 4,316,097 | 2/1982 | Reynolds ............................... | 307/66 |
| 4,362,951 | 12/1982 | Turner et al. ......................... | 307/66 |
| 4,417,185 | 11/1983 | Bullat .................................... | 160/1 X |
| 4,506,766 | 3/1985 | Watanabe ........................... | 307/66 X |
| 4,528,457 | 7/1985 | Keefe et al. ........................ | 307/66 X |
| 4,548,299 | 10/1985 | Nomura .............................. | 307/64 X |
| 4,554,999 | 11/1985 | Kamaike ............................ | 307/66 X |
| 4,556,802 | 12/1985 | Harada et al. ....................... | 307/66 |

Primary Examiner—William M. Shoop, Jr.
Assistant Examiner—Paul Ip
Attorney, Agent, or Firm—Tarolli, Sundheim & Covell

[57] ABSTRACT

A shutter control apparatus is disclosed for providing an auxiliary power source to drive a shutter motor. A double-pole, double-throw switch selectively connects an electric shutter motor to a primary electrical source of power or, when the primary source of power is interrupted, is switched to connect a self contained auxiliary power source to the shutter motor so as to permit extension and retraction of the shutter door.

5 Claims, 2 Drawing Sheets

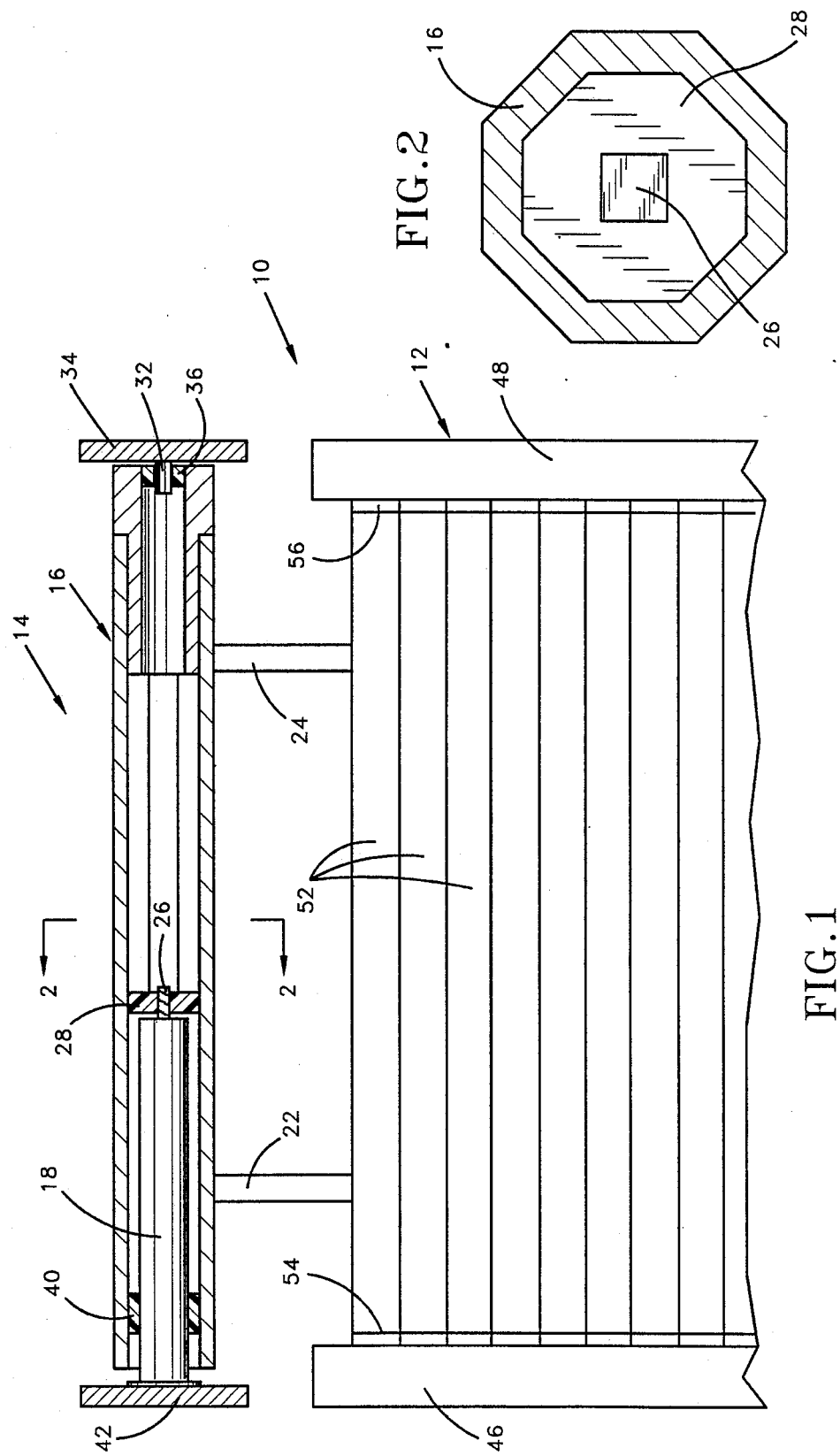

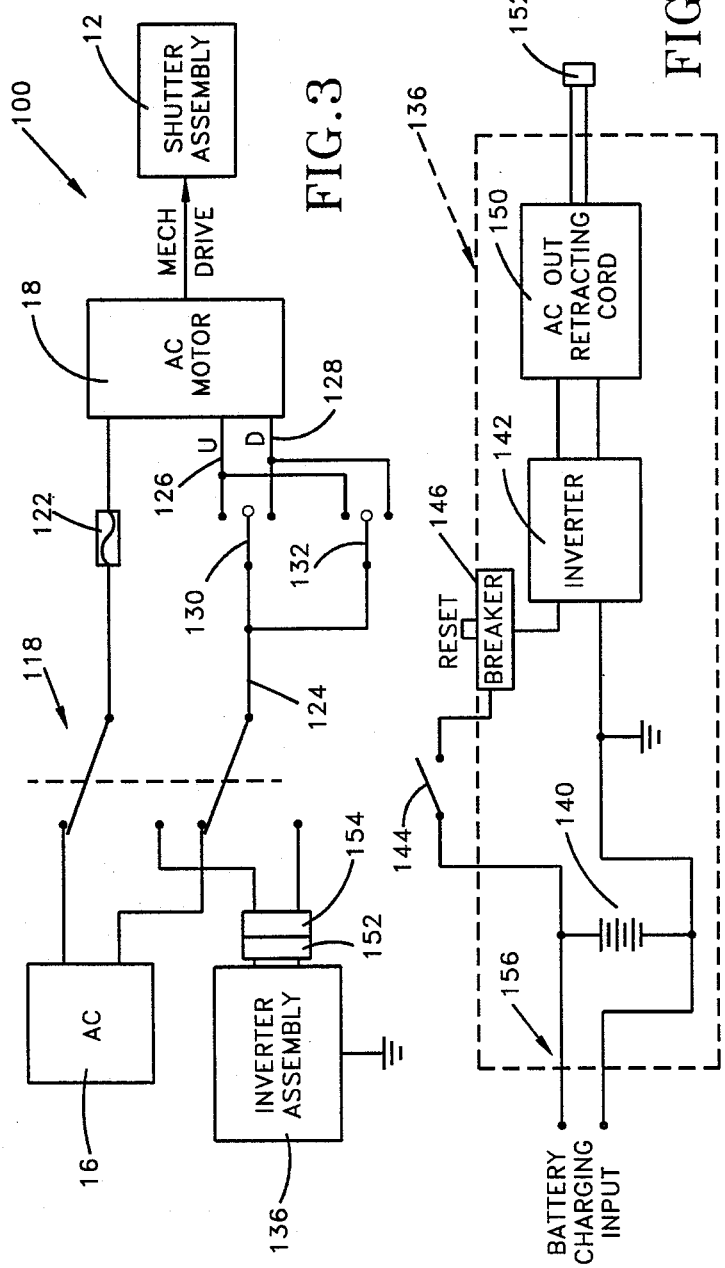
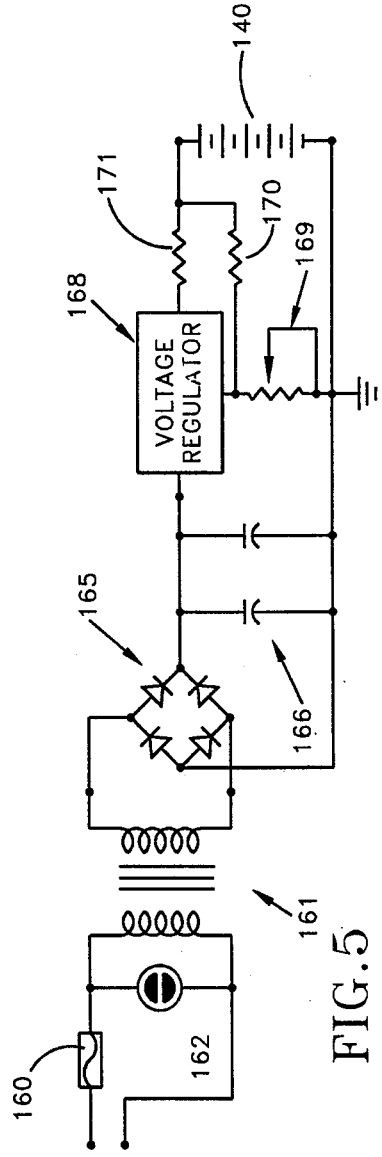

SHUTTER CONTROL APPARATUS

TECHNICAL FIELD

The present invention relates to a shutter control apparatus and is particularly directed to an apparatus for opening or closing an electrically driven shutter during a general power failure.

BACKGROUND ART

Retractable shutters for use as doorway or window closures are well known in the art. Such shutters typically include a plurality of small segmented sections flexibly joined together. The shutter can be rolled up and is typically stored overhead of the doorway or window in a cylindrical housing. Tracks are located on the sides of the doorway or window to guide the shutter during extension (closing) and retraction (opening).

The extension and retraction of an overhead shutter is typically accomplished by use of an AC electric motor powered from the general AC voltage source in the building which is typically provided by a local utility company. It is typical on shutter assemblies to have a mechanical drive capability to open and close the shutter should the AC power to the building be interrupted for an extended period of time. The mechanical drive arrangement includes an opening in the cylindrical housing that stores the shutter to permit access to a mechanically drivable gear An operator, using a long shaft having a U-shaped handle portion near one end and a keyed portion at the other end, inserts the shaft into the opening and engages the keyed portion of the shaft with a drive gear. Upon mechanical rotation of the drive shaft using the U-shaped handle portion, the shutter can be retracted or extended mechanically.

SUMMARY OF THE PRESENT INVENTION

The present invention provides an apparatus for retracting or extending a shutter during a general power failure without an operator resorting to use of a mechanical driver. In accordance with the present invention, a portable inverter assembly having a DC power source and an inverter, are provided to generate an auxiliary AC electrical energy source. A power changeover switch which may be the double-pole, double-throw ("DPDT") type, has its common terminals electrically connected to the shutter motor, one pair of switch terminals connected to the AC power source for the building, and a second pair of switch terminals connected to an inverter access connector.

The power changeover switch is typically connected to the AC power source for the building to provide power to the shutter drive motor under normal circumstances. If a general power failure occurs for an extended period of time and it is desired to either retract or extend the shutter, the power changeover switch is actuated to connect the portable inverter assembly to the shutter drive motor. The inverter assembly provides sufficient electrical energy to power the shutter motor.

In a preferred embodiment, the inverter assembly includes a self-contained DC battery source electrically connected to an input of an inverter. The output of the inverter is electrically connected to a retractable chord having one end which is connected to the inverter and a second end which is connectable to the power changeover switch. The inverter assembly includes a battery charging input that is connectable to a typical battery charger for charging of the internal battery of the inverter assembly.

BRIEF DESCRIPTION OF THE DRAWINGS

Other features and advantages of the invention will be apparent to those skilled in the art by reference to the following detailed description taken in connection with the accompanying drawings, wherein:

FIG. 1 is a schematic illustration of a shutter assembly;

FIG. 2 is a sectional view, taken along the line 2—2 of FIG. 1, illustrating how a motor is connected with a roller in the shutter assembly of FIG. 1;

FIG. 3 is a schematic illustration of a shutter control circuit constructed in accordance with the present invention;

FIG. 4 is a schematic illustration of a portable inverter assembly shown in FIG. 3; and FIG. 5 is a schematic illustration of a battery charger.

DESCRIPTION OF ONE PREFERRED EMBODIMENT OF THE INVENTION

A shutter assembly 10 includes a flexible shutter 12 which is movable between an extended (lowered) position shown in FIG. 1 and a retracted (raised) position by operation of a drive assembly 14. The drive assembly 14 includes a roller 16 which is rotatable about its longitudinal central axis by operation of a reversible electric motor 18 to extend and retract shutter 12. The shutter 12 is connected with the roller 16 by a pair of flexible straps 22 and 24.

Upon operation of the AC electric motor 18, drive forces are transmitted from a rectangular motor drive shaft 26 (FIG. 2) to a polygonal drive member 28 which engages a polygonal inner side surface of the roller 16. The right (as viewed in FIG. 1) end of the roller 16 is supported by a bearing 36 on a stationary cylindrical stub shaft 32 which is fixedly connected to a base or frame member 34. The opposite end of the roller 16 is rotatably supported on a cylindrical outer housing of the motor 18 by a bearing 40. The cylindrical outer housing of the motor 18 is fixedly connected to a base or frame member 42.

When the flexible shutter 12 is to be retracted (raised), the motor 18 is operated to rotate the roller 16 about its central axis under the influence of drive forces transmitted from the motor output shaft 26 through the drive member 28. Rotation of the roller 16 relative to the frame members 34 and 42 winds the straps 22 and 24 around the roller. As this occurs, the shutter 12 is raised upwardly on a pair of parallel guide tracks 46 and 48.

Continued operation of the electric motor 18 wraps the shutter slats 52 around the roller 16. The shutter slats 52 are flexibly interconnected at their opposite end portions in the manner indicated schematically at 54 and 56 in FIG. 1. The connections 54 and 56 allow the slats 52 to move relative to each other as they are wrapped around the roller 16.

When the shutter 12 is to be extended (lowered), the direction of operation of the electric motor 18 is reversed. Reversal of the direction of operation of the motor 18 reverses the direction of rotation of the roller 16 relative to the frame members 34 and 42. This results in the shutter 12 moving downwardly along the guide tracks 46 and 48 as it is unwound from the roller 16.

A shutter control circuit 100 for controlling the operation of the electric motor 18 is illustrated schematically in FIG. 3. Th AC motor 18 is electrically connectable to an general AC source 116 of power of the type typically provided by a public utility company through a double-pole, double-throw ("DPDT") power changeover switch 118. One line of the AC source 120 is electrically connected through a fuse 122 to the AC motor 18. The other AC line 124 is electrically connectible to an UP input 126 or a DOWN input 128 of the AC motor 18 through a first control switch 130 or a second control switch 132. Each of the control switches 130, 132 is single-pole, double-throw ("SPDT") momentary switch that connects the power line 124 to an UP terminal or a DOWN terminal of the switch which are, in turn, respectively connected to the UP input 126 or the DOWN input 128.

There are two single pole, double-throw momentary control switches 130, 132 in the shutter control apparatus 10. This enables switch 130 to be located inside the building, while the other switch 132 is located outside the building. Typically, it would be desirable to have the outside switch 132 to be a key operated switch for security purposes and the inside switch 130 to be a toggle switch for convenience. When the switch 130 or 132 is released, it moves to an open condition under the influence of a biasing force.

A portable inverter assembly 136 is electrically connectible to a second pair of terminals of the DPDT power changeover switch 118. In the case of a general power failure, i.e., loss of the AC electrical energy from the source 16, the switch 118 can be actuated to connect the output of the inverter assembly 136 to the AC motor 18 and thereby provide a drive means to extend or retract the shutter 12.

Referring to FIG. 4, the portable inverter assembly 136 includes an internal storage battery 140 electrically connectible to the inputs of a DC-to-AC power inverter 142 through a master control switch 144 and a circuit breaker 146. The master control switch 144 is a typical ON and OFF switch and the circuit breaker 146 is a high amperage current breaker which is mechanically resettable and is used to protect the storage battery 140. The DC-to-AC power inverter 142 is of the type well known in the art, such as Model PV-400 manufactured by Trip-Lite which converts 12 volts DC to 117 volts AC.

The output of the inverter 142 is electrically connected to a retractable cord assembly 150 having an end connector 152 which can be mated with an inverter access connector 154 (FIG. 3) which is, in turn, electrically connected to a pair of terminals of the DPDT switch 118. A battery charging input 156 (FIG. 4) is provided in the portable inverter assembly 136 to permit connection of a battery charger to the inverter for the purpose of charging the storage battery 140. Battery charging circuits are well known in the art and will not be described in detail herein. The entire inverter assembly is advantageously enclosed in a box indicated by dashed lines in FIG. 4.

To better understand the operation of the present invention, a specific example will be given. Assume that the AC souce 16 (FIG. 3) is available for use to drive the AC motor 18. The DPDT switch 118 is positioned under such conditions so as to connect the AC source 16 to the AC motor 18. The shutter assembly 10 is extended or retracted utilizing power derived from the AC source 16.

When the shutter assembly 12 is to be extended, either the inside switch 130 or the outside switch 132 is actuated to connect the power line 124 with the motor line 128. This results in operation of the electric motor 18 in a direction to lower the shutter 12. When the shutter assembly 12 has been fully extended, the actuated switch 130 or 132 is released to interrupt the operation of the electric motor 18.

When the shutter assembly 12 is to be retracted, either the switch 130 or 132 is actuated to connect the power line 124 with the motor line 126. When the shutter assembly 12 has been fully retracted, the actuated switch 130 or 132 is released to interrupt operation of the motor 18. Thus, as long as the AC source 16 functions to provide current, either one of the two single pole, double-throw momentary switches 130 or 132 can be actuated to operate the motor 18 to either raise or lower the shutter 12.

Now, assume that the AC source 16 is interrupted for an extended period of time. When it is desired to extend or retract the shutter 12, the power changeover switch 118 is actuated to the position that connects the inverter access connector 154 to the AC motor 18. The AC cord 150 is pulled from the inverter assembly 136 and the AC connector 152 is mated with the access connector 154 (FIG. 3). Power to actuate the AC motor 18 and thereby retract or extend the shutter assembly 12 is furnished from the inverter assembly 136. Once the AC power 16 is restored, the power changeover switch 118 is actuated so as to connect the AC source 16 to the AC motor 18. The inverter assembly 136 would typically then be charged so as to insure that the storage battery 140 is energized and ready for its next possible use.

In view of the foregoing description, it is apparent that the shutter control circuit 100 is normally energized by a standard 110 volt AC power source 16. However, when the shutter 12 is to be extended or retracted during a general power failure, a power changeover switch 118 is actuated to connect the control switches 130 and 132 and motor 18 with the portable inverter assembly 136. The inverter assembly 136 includes a DC power source 140 and an inverter 142 which provides an auxiliary AC electrical source. The inverter assembly 136 will then supply the power for operating the shutter drive motor 18 without resorting to a manually actuated drive assembly.

FIG. 5 illustrates a charging circuit for charging the battery 140. This charging circuit could be built into the unit. The battery charging circuit may be connected to an AC power source (such as a house outlet) to charge the battery 140. The charging circuit is designed to permit continuous charging without over charging. A fuse 160 is connected to the primary side of a transformer 161 to protect the charging unit. A neon lamp 162 is connected across the input power line. The transformer 161 is used to step-down the AC supply voltage to approximately 12.6 volts RMS. A conventional silicon bridge rectifier 165 is used to rectify the transformer output to approximately 18 volts DC. A filter capacitor 166 is connected to the rectified output to reduce the AC ripple. A voltage regulator 168 is connected to the filtered DC voltage and outputs a settable DC voltage which is used to charge the battery 140. A feedback signal is inputted to the voltage regulator 168 through a resistor network including a potentiometer 169 and resistor 170. The DC output voltage from regulator 168 is adjustable by varying the potentiometer 169. A resistor 171 is connected between the regulator output and the battery to permit a minor voltage differential between a battery at full charge and the voltage regulator output.

The invention has been described above referring to preferred embodiments. Alternations and modifications may occur to those skilled in the art upon reading and understanding this specification. For example, an inverter assembly 136 can be used that does not have its own internal battery. A battery from an automobile vehicle can be used and connected to the input of a power inverter so as to provide a source of energy to operate the inverter. It is my intention to include all such modifications and alterations insofar as they come within the scope of the appended claims or the equivalent thereof.

Having described a specific preferred embodiment of the invention, the following is claimed:

1. An apparatus for actuating from outside of a building an electric motor drive for winding and unwinding a shutter on the building, said apparatus comprising:
   switch means located outside of the building and having a first position in which it connects the main electric current supply of the building with said electric motor drive;
   an auxiliary electric power source for directing electric power to said electric motor drive when the main electric power supply is lost;
   access means located outside of the building and connected with said auxiliary electric power source for connecting said auxiliary electric power source and said electric motor drive; and
   said switch means having a second position in which it connects said access means with said electric motor drive.

2. An apparatus as set forth in claim 1 wherein said electric motor drive comprises an alternating current electric motor, and said auxiliary electric power source comprises a direct current source and an inverter for converting direct current into alternating current.

3. An apparatus as set forth in claim 2 wherein said direct current source is a battery and said apparatus comprises means for charging said battery from the alternating current main supply of the building.

4. An apparatus as set forth in claim 1 wherein said electric motor drive comprises a reversible electric motor, said apparatus further comprising switch means for controlling dirrection of application of the electric power to said reversible electric motor.

5. An apparatus comprising:
   a roll-up shutter for a building;
   a rotatable tube on which said roll-up shutter is wound;
   a revresible alternating current electric motor for rotating said rotatable tube in opposite directions to wind said roll-up shutter onto the tube and to unwind said roll-up shutter therefrom;
   first switch means located outside of the building and having a first position in which it connects the main electric alternating current supply of the building with said electric motor;
   an auxiliary electric power source for directing electric power to said electric motor when the main electric current supply is lost, said auxiliary power source comprising:
   a direct current battery,
   means for charging said battery from the main electric current supply, and
   an inverter for converting direct current from the battery to alternating current;
   access means located outside of the building for connecting said inverter with said electric motor, said first switch means having a second position in which it connects said access means with said electric motor when the main electric current supply is lost; and
   second and third switch means located, respectively, inside and outside of the building for actuating said electric motor when said first switch means is in its first or second positions.

* * * * *